US006405531B1

(12) United States Patent
Hong

(10) Patent No.: US 6,405,531 B1
(45) Date of Patent: Jun. 18, 2002

(54) JACK

(76) Inventor: Wen-Cheng Hong, 10, Third Industry Rd., Ming Shung, Shia, Gia Yi Hsien (TW)

( * ) Notice: Subject to any disclaimer, the term of this patent is extended or adjusted under 35 U.S.C. 154(b) by 0 days.

(21) Appl. No.: 09/770,046

(22) Filed: Jan. 25, 2001

(51) Int. Cl.[7] ................................................ F16D 31/02
(52) U.S. Cl. ........................................................ 60/481
(58) Field of Search ........................... 60/477, 481, 482

(56) References Cited

U.S. PATENT DOCUMENTS

| | | | | | |
|---|---|---|---|---|---|
| 1,032,993 | A | * | 7/1912 | Cordell | 60/481 |
| 3,455,211 | A | * | 7/1969 | Dugelay | 60/481 |
| 3,701,211 | A | * | 10/1972 | Best | 60/477 X |
| 3,730,125 | A | * | 5/1973 | Krueger | 60/477 X |
| 3,867,895 | A | * | 2/1975 | Ameigh | 60/477 X |
| 4,048,800 | A | * | 9/1977 | Cancilla | 60/477 |
| 4,136,521 | A | * | 1/1979 | Mendoza et al. | 60/477 |
| 4,144,713 | A | * | 3/1979 | Clark et al. | 60/477 |
| 4,285,641 | A | * | 8/1981 | Brimhall | 60/477 X |
| 4,492,106 | A | * | 1/1985 | Amighini | 60/477 X |
| 4,825,755 | A | * | 5/1989 | Takano | 60/477 X |
| 4,895,042 | A | * | 1/1990 | Wang | 60/477 X |
| 4,947,672 | A | * | 8/1990 | Pecora et al. | 60/477 X |
| 5,755,099 | A | * | 5/1998 | Hung | 60/481 X |
| 6,240,726 | B1 | * | 6/2001 | Lin | 60/481 X |

FOREIGN PATENT DOCUMENTS

| | | | | |
|---|---|---|---|---|
| AT | 217957 | * | 11/1961 | 60/481 |
| FR | 544066 | * | 6/1922 | 60/477 |
| FR | 591358 | * | 4/1925 | 60/482 |
| GB | 796031 | * | 6/1958 | 60/482 |

* cited by examiner

*Primary Examiner*—John E. Ryznic
(74) *Attorney, Agent, or Firm*—Alan Kamrath; Rider, Bennett, Egan & Arundel, LLP

(57) ABSTRACT

A jack has a first oil cylinder, an inner cylinder disposed in the first oil cylinder, an upper cover covering the first oil cylinder and the inner cylinder, a piston and a piston rod inserted in the inner cylinder, the piston connected to the piston rod, the piston rod passing through the upper cover, an extended plate extending from the upper cover, a collar disposed on a bottom of the extended plate, a second oil cylinder inserted through the collar, the second oil cylinder having a lower enlarged neck, a push rod inserted through the second oil cylinder, an arm plate connected to the collar, a retainer connected to the push rod, a lever fastening a connector and the retainer together, and a handle rod connected to the connector. The connector has a slot for receiving the arm plate. A pivot pin fastens the connector and the are plate together.

2 Claims, 10 Drawing Sheets

JACK

BACKGROUND OF THE INVENTION

The present invention relates to a jack. More particularly, the present invention relates to a jack which has a first oil cylinder and a second oil cylinder.

Referring to FIG. 9, a first conventional jack is disposed on a first lifting device. The first conventional jack has an oil cylinder 10 and a handle 20 controlling the oil cylinder 10. The oil cylinder 10 is operated in one direction only.

Referring to FIG. 10, a second conventional jack is disposed on a second lifting device. The second conventional jack has an oil cylinder 10' and a handle 20' controlling the oil cylinder 10'. The oil cylinder 10' is operated in one direction only.

SUMMARY OF THE INVENTION

An object of the present invention is to provide a jack which has a first oil cylinder and a second oil cylinder to operate the jack in two directions.

Accordingly, a jack comprises a first oil cylinder, an inner cylinder disposed in the first oil cylinder, an upper cover covering the first oil cylinder and the inner cylinder, a piston and a piston rod inserted in the inner cylinder, the piston connected to the piston rod, the piston rod passing through the upper cover, an extended plate extending from the upper cover, a collar disposed on a bottom of the extended plate, a second oil cylinder inserted through the collar, the second oil cylinder having a lower enlarged neck and an inner chamber, a push rod inserted through the inner chamber of the second oil cylinder, an arm plate connected to the collar, a retainer connected to the push rod, a lever fastening a connector and the retainer together, and a handle rod connected to the connector. The connector has a slot for receiving the arm plate. A pivot pin fastens the connector and the arm plate together. An oil pipe is disposed between the first oil cylinder and the inner cylinder.

DETAILED DESCRIPTION OF THE INVENTION

Figure 1:
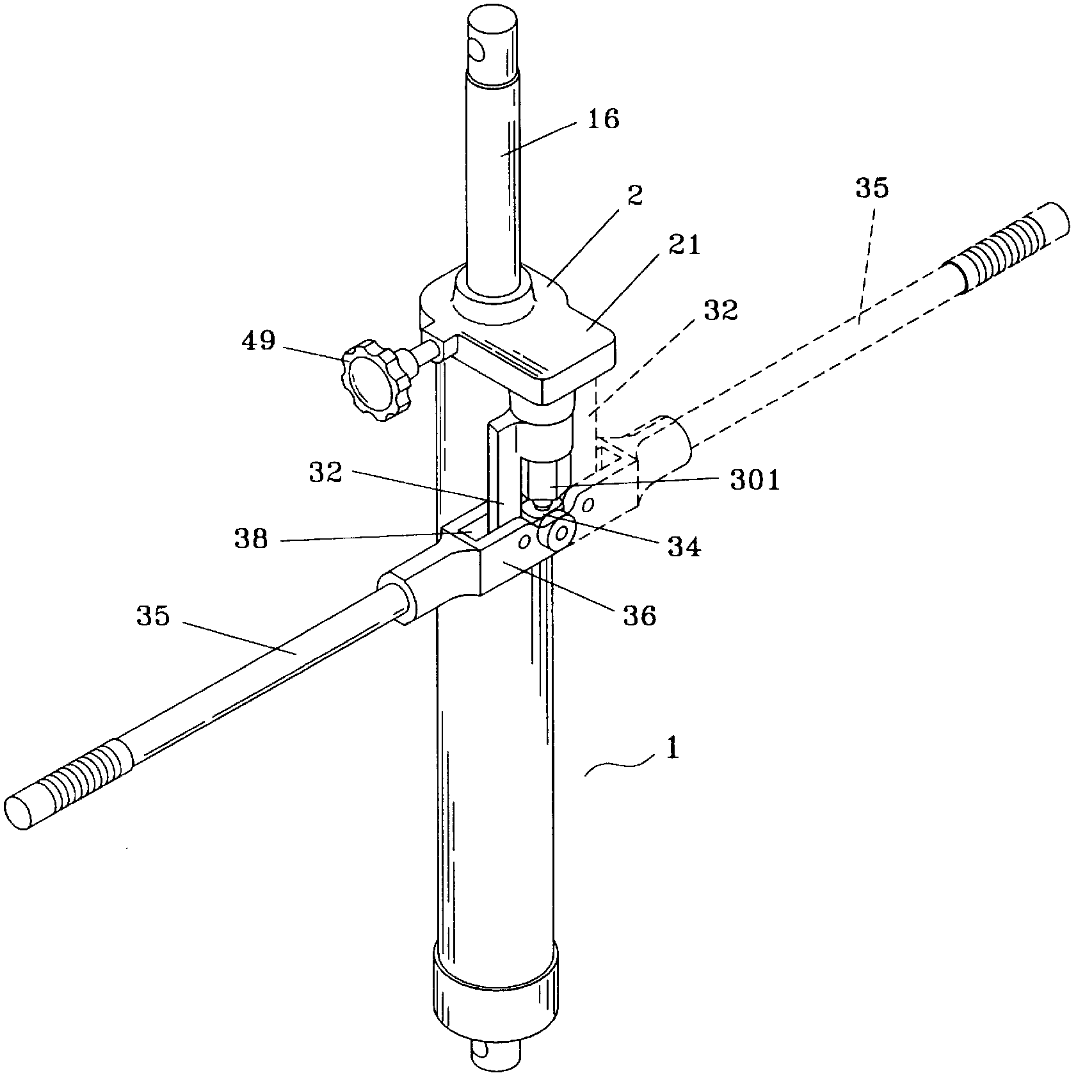
FIG. 1 is a perspective assembly view of a jack of a preferred embodiment in accordance with the present invention.

Referring to FIGS. 1 to 8, a jack 1 comprises a first oil cylinder 11, an inner cylinder 13 disposed in the first oil cylinder 11, an upper cover 2 covering the first oil cylinder 11 and the inner cylinder 13, a piston 15 and a piston rod 16 inserted in the inner cylinder 13, the piston 15 connected to the piston rod 16, the piston rod 16 passing through the upper cover 2, an extended plate 21 extending from the upper cover 2, a collar 22 disposed on a bottom of the extended plate 21, a second oil cylinder 3 inserted through the collar 22, the second oil cylinder 3 having a lower enlarged neck 301 and an inner chamber 302, a push rod 33 inserted through the inner chamber 302 of the second oil cylinder 3, an arm plate 32 connected to the collar 22, a retainer 34 connected to the push rod 33, a lever 37 fastening a connector 36 and the retainer 34 together, and a handle rod 35 connected to the connector 36.

The retainer 34 has a notch 341.

The connector 36 has a slot 38 for receiving the arm plate 32. A pivot pin 39 fastens the connector 36 and the arm plate 32 together.

An oil pipe 12 is disposed between the first oil cylinder 11 and the inner cylinder 13.

An oil control unit 4 has a first channel 41 formed in the extended plate 21, a second channel 42 formed in the extended plate 21, a third channel 44 formed in the extended plate 21, a fourth channel 46 formed in the extended plate 21, a fifth channel 47 formed in the upper cover 2, and an oil outlet 14 formed in the upper cover 2.

The first channel 41 communicates with the second channel 42. A first ball 43 is disposed in the second channel 42 to block the first channel 41.

The second channel 42 communicates with the third channel 44. A second ball 45 is disposed in the third channel 44 to block the second channel 42.

The fourth channel 46 communicates with the third channel 44 and the inner cylinder 13.

The fifth channel 47 communicates with the first oil cylinder 11 and the inner cylinder 13. A third ball 48 is disposed in the fifth channel 47.

The oil outlet 14 communicates with the first oil cylinder 11 and the fifth channel 47.

A swivel button 49 has a threaded end 491 inserted in the fifth channel 47.

The oil pipe 12 communicates with the first channel 41.

Figure 3:
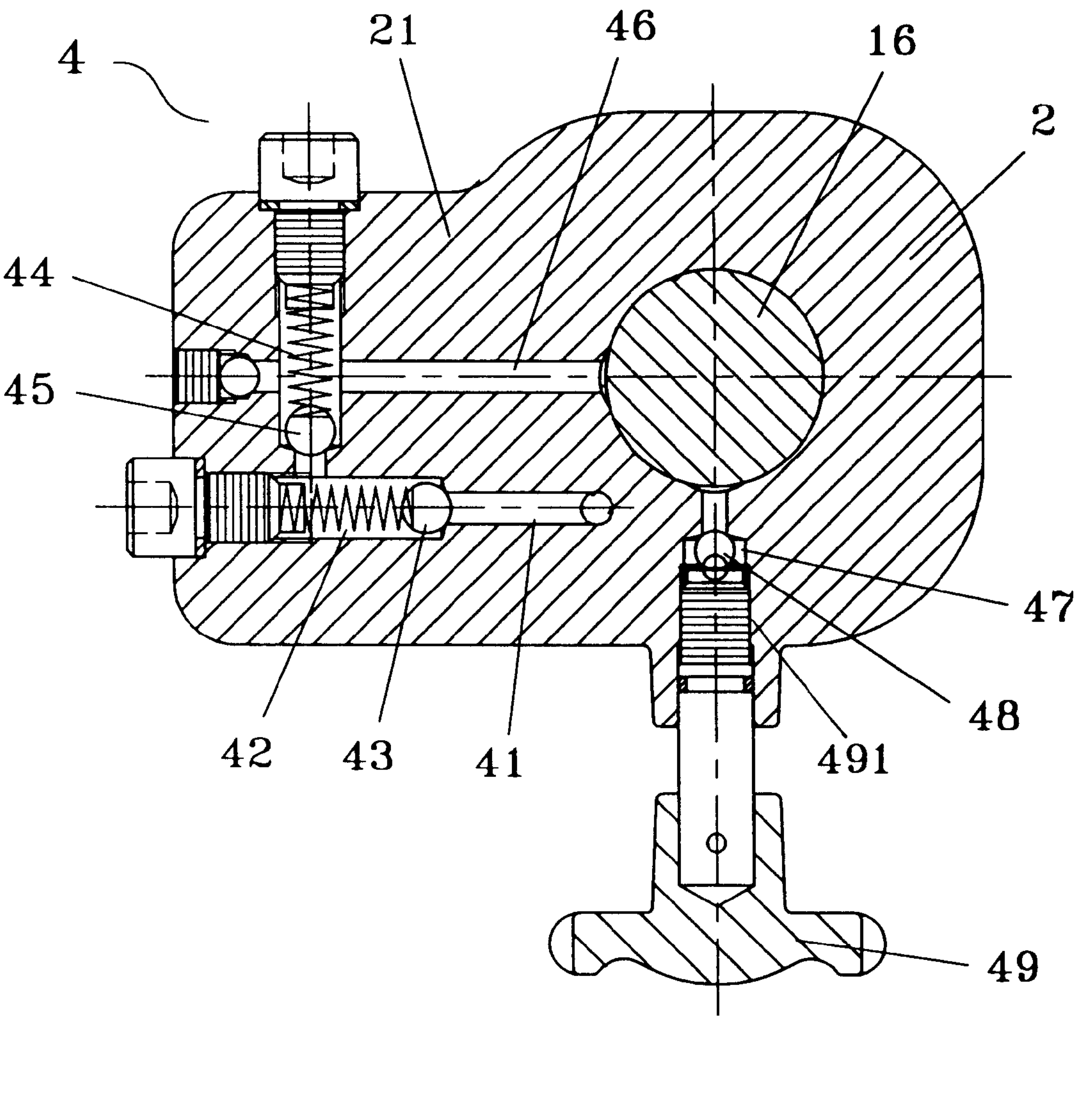
FIG. 3 is a second sectional assembly view of a jack of a preferred embodiment in accordance with the present invention.
Figure 4:
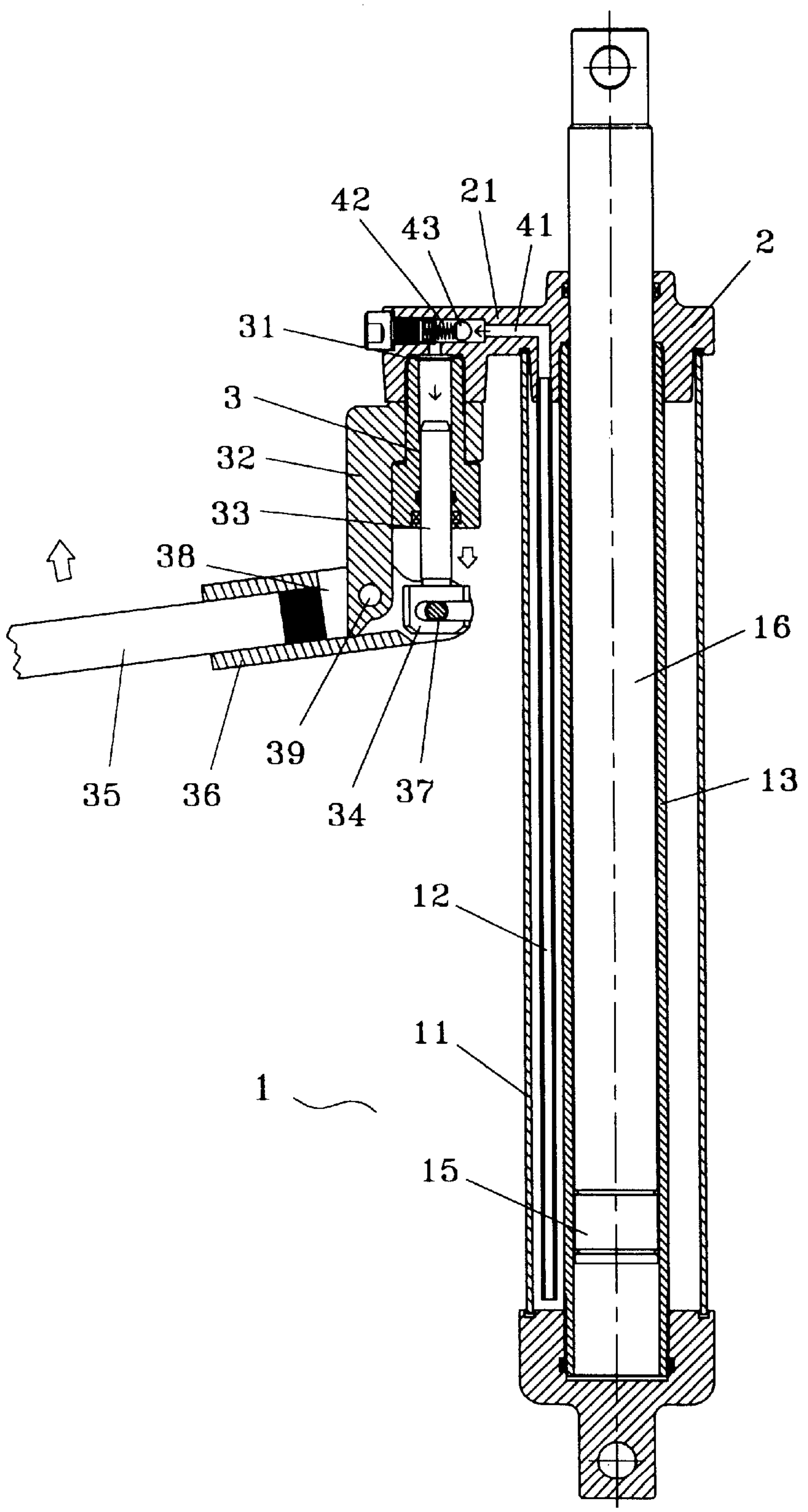
FIG. 4 is a schematic view illustrating an operation of a jack of a preferred embodiment in accordance with the present invention.

Referring to FIGS. 3 and 4, the push rod 33 moves downward. The first ball 43 will not block the first channel 41. Then oil passes thorugh the oil pipe 12 to the first channel 41 and the second channel 42.

Figure 2:
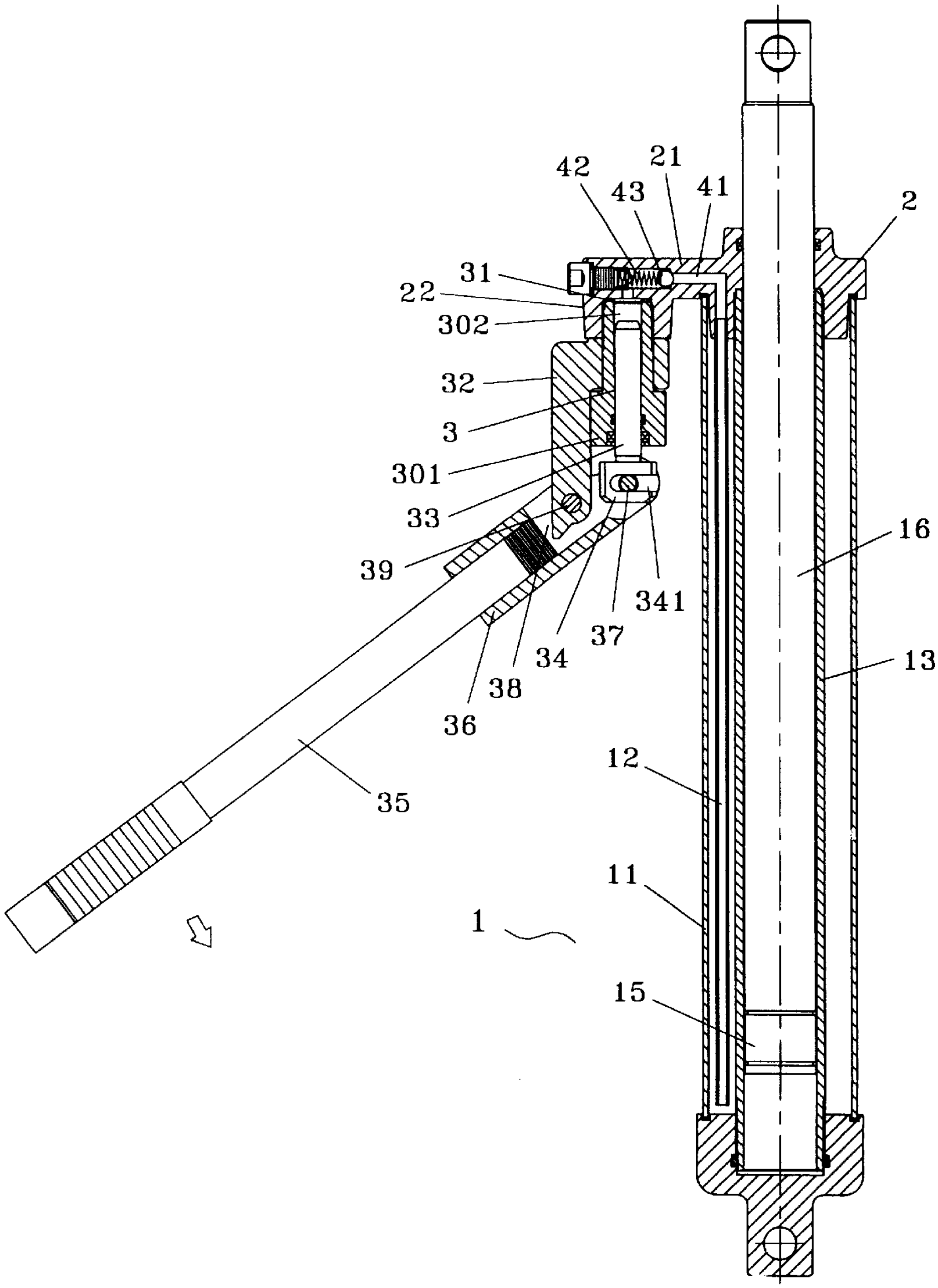
FIG. 2 is a sectional assembly view of a jack of a preferred embodiment in accordance with the present invention.

Referring to FIG. 2, the push rod 33 moves upward. The first ball 43 will block the first channel 41. The second ball 45 will not block the second channel 42. Then the second channel 42 communicates with the third channel 44.

Figure 5:
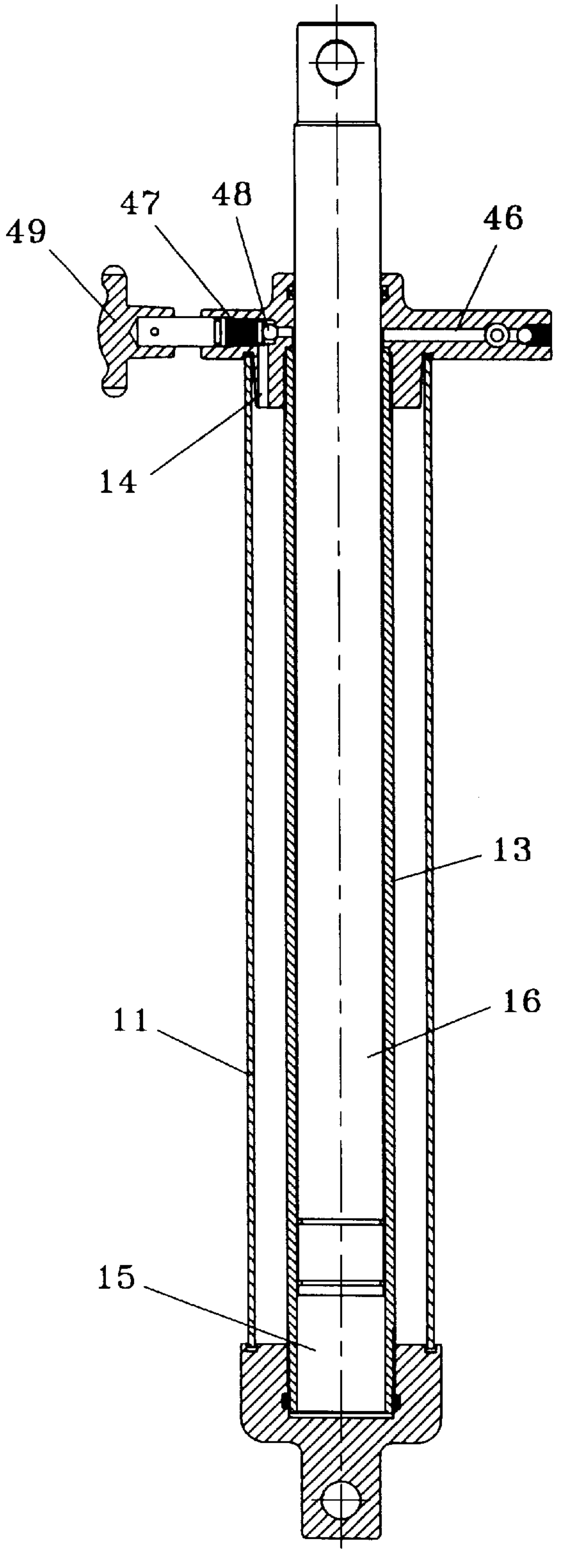
FIG. 5 is a third sectional assembly view of a jack of a preferred embodiment in accordance with the present invention.
Figure 6:
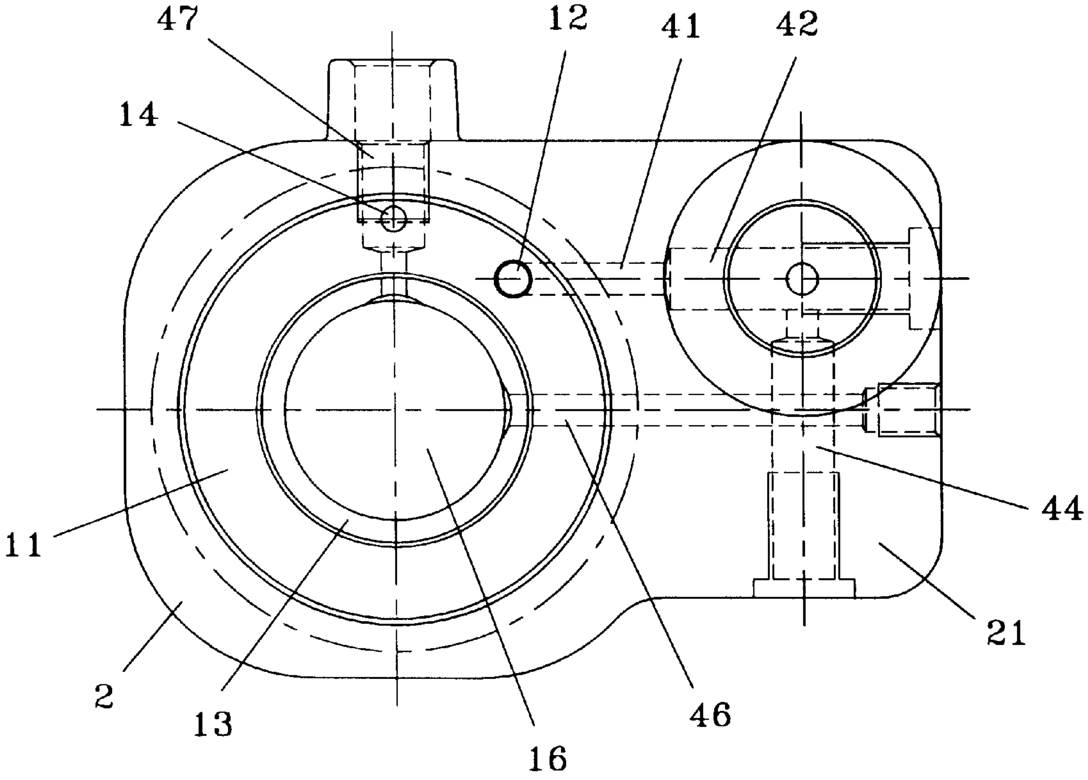
FIG. 6 is a schematic view illustrating an arrangement of oil channels of a jack of a preferred embodiment in accordance with the present invention.
Figure 7:
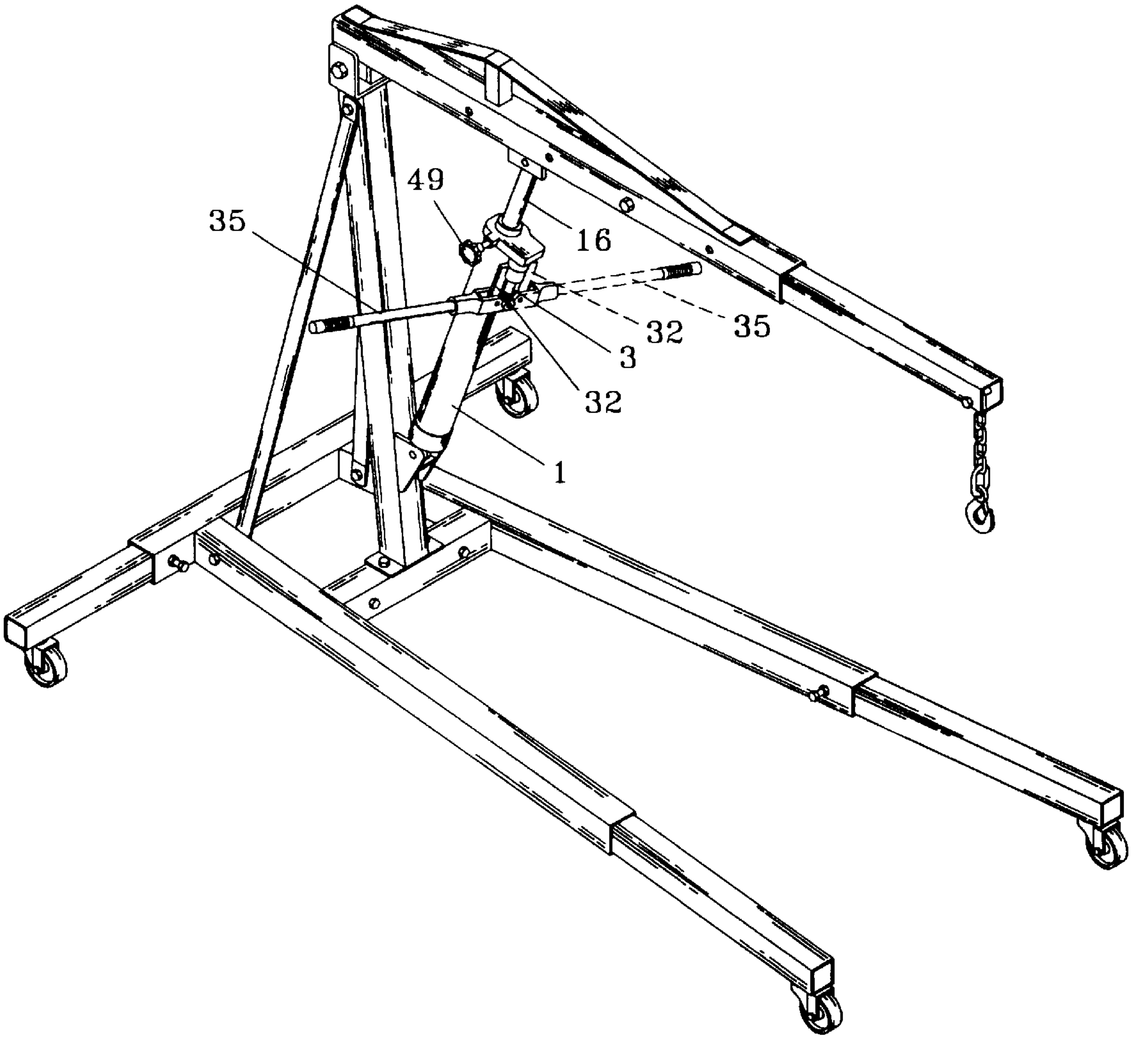
FIG. 7 is a schematic view illustrating a first application of a jack of a preferred embodiment in accordance with the present invention.
Figure 8:
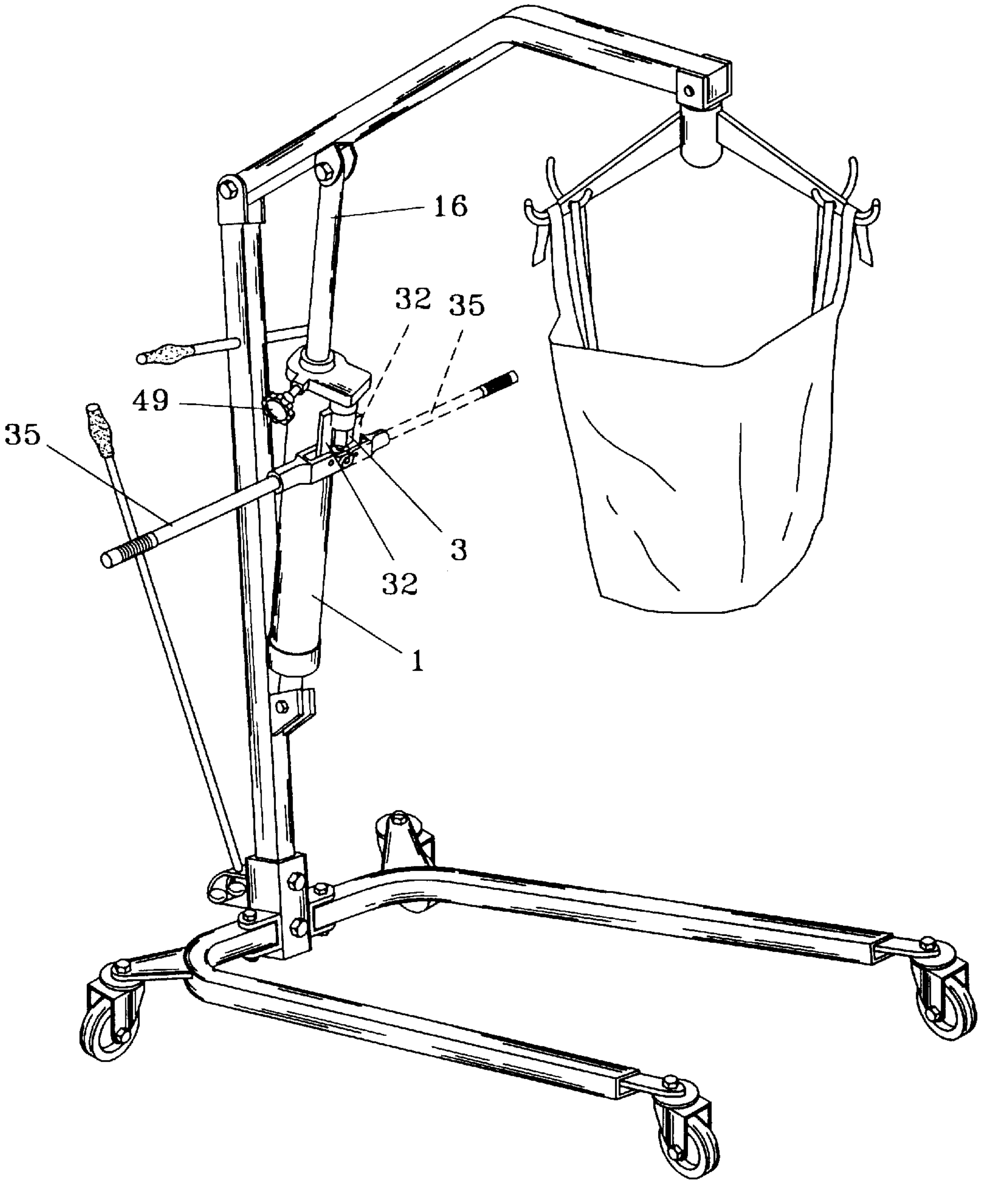
FIG. 8 is a schematic view illustrating a second application of a jack of a preferred embodiment in accordance with the present invention.
Figure 9:
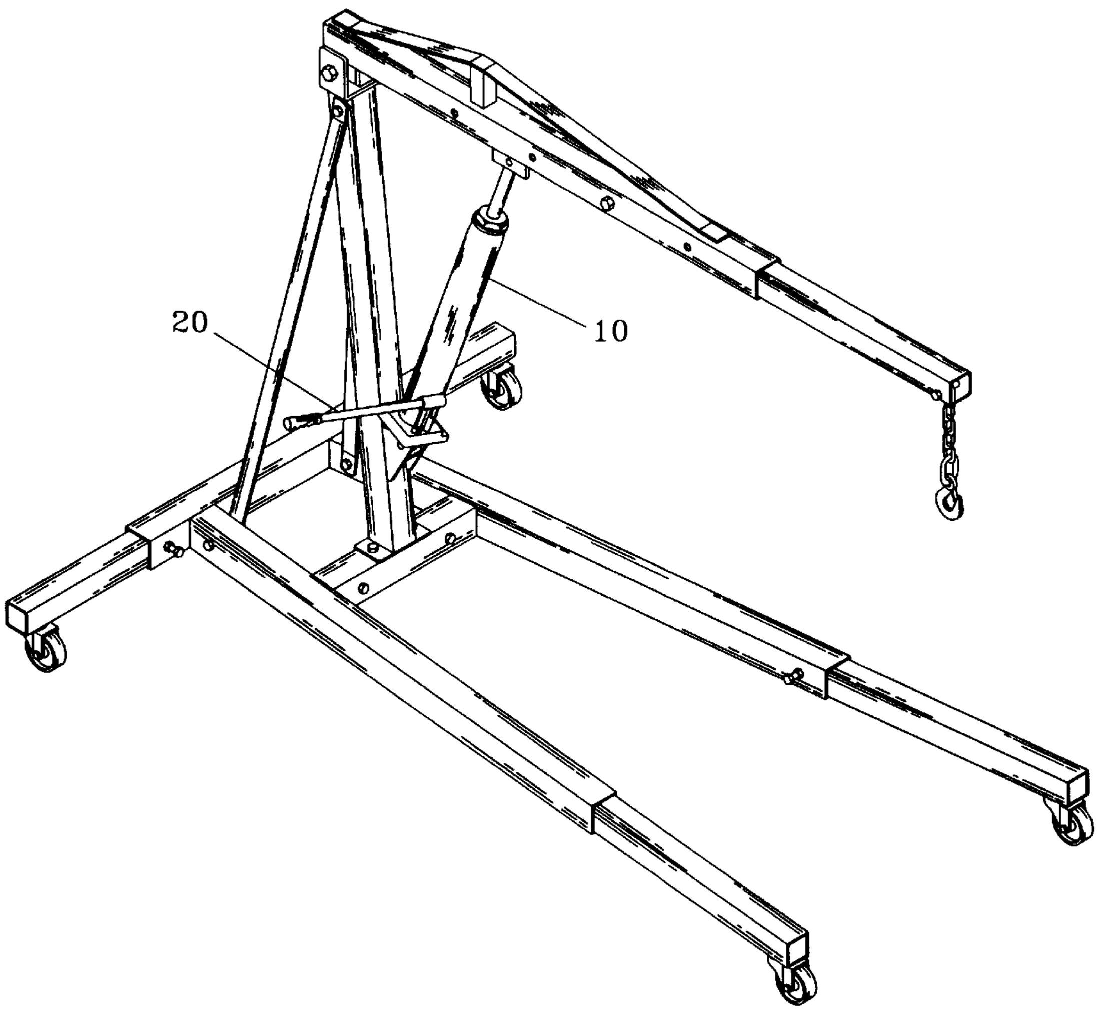
FIG.9 PRIOR ART
FIG. 9 is a schematic view illustrating a first application of a conventional jack of the prior art.
Figure 10:
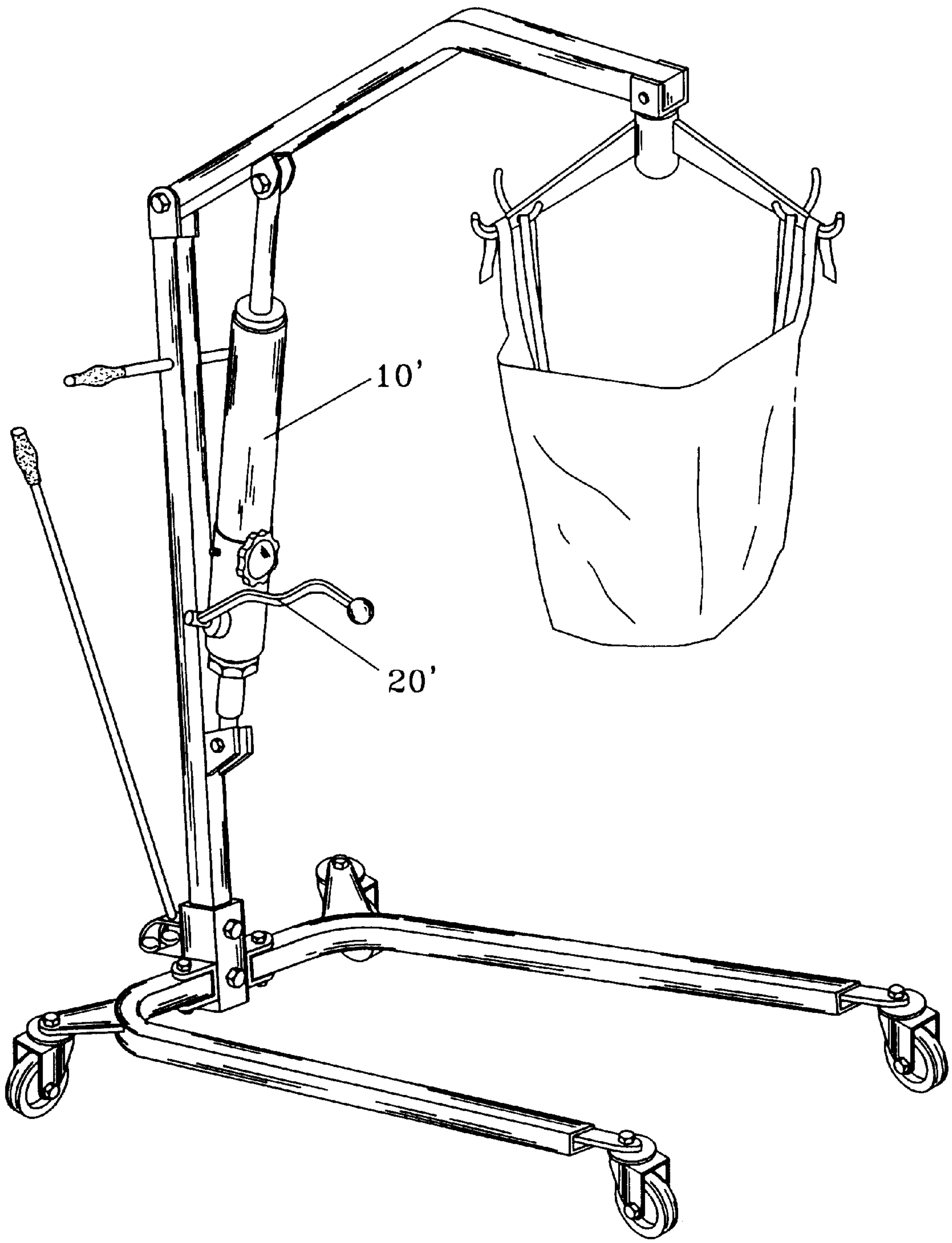
FIG.10 PRIOR ART
FIG. 10 is a schematic view illustrating a second application of a conventional jack of the prior art.

Referring to FIG. 5, the swivel button 49 is loosened so that the fifth channel 47 communicates with the inner cylinder 13. Then oil will passes through the fifth channel 47 to the first oil cylinder 11.

The invention is not limited to the above embodiment but various modification thereof may be made. Further, various changes in form and detail may be made without departing from the scope of the invention.

I claim:

1. A jack comprises:

a first oil cylinder, an inner cylinder disposed in the first oil cylinder, an upper cover covering the first oil cylinder and the inner cylinder, a piston and a piston rod inserted in the inner cylinder, the piston connected to the piston rod, the piston rod passing through the upper cover, an extended plate extending from the upper cover, a collar disposed on a bottom of the extended plate, a second oil cylinder inserted through the collar, the second oil cylinder having a lower enlarged neck and an inner chamber, a push rod inserted through the inner chamber of the second oil cylinder, an arm plate connected to the collar, a retainer connected to the push rod, a lever fastening a connector and the retainer together, a handle rod connected to the connector, the connector having a slot for receiving the arm plate, a pivot pin fastening the connector and the arm plate together, and an oil pipe disposed between the first oil cylinder and the inner cylinder.

2. The jack as claimed in claim 1, wherein an oil control unit has a first channel formed in the extended plate, a second channel formed in the extended plate, a third channel formed in the extended plate, a fourth channel formed in the extended plate, a fifth channel formed in the upper covet, and an oil outlet formed in the upper cover, the first channel communicates with the second channel, a first ball is disposed in the second channel, the second channel communicates with the third channel, a second ball is disposed in the third channel, the fourth channel communicates with the third channel and the inner cylinder, the fifth channel communicates with the first oil cylinder and the inner cylinder, a third ball is disposed in the fifth channel, the oil outlet communicates with the first oil cylinder and the fifth channel, a swivel button has a threaded end inserted in the fifth channel, and the oil pipe communicates with the first channel.

* * * * *